United States Patent [19]
Levy

[11] Patent Number: 5,535,625
[45] Date of Patent: Jul. 16, 1996

[54] INTEGRATED LIQUID LEVEL AND AUXILIARY SENSOR SYSTEM AND METHOD

[75] Inventor: Jonathan Levy, Great Neck, N.Y.

[73] Assignee: Magnetek, Inc., Clawson, Mich.

[21] Appl. No.: 209,883

[22] Filed: Mar. 14, 1994

[51] Int. Cl.$^6$ .................................................. G01F 23/30
[52] U.S. Cl. ........................ 73/290 V; 73/291; 73/292; 73/313; 324/207.21
[58] Field of Search .................... 73/290 V, 291, 73/292, 313; 324/207.21, 207.13, 207.14, 207.24

[56] References Cited

U.S. PATENT DOCUMENTS

| | | | |
|---|---|---|---|
| 3,898,555 | 8/1975 | Tellerman . | |
| 4,028,619 | 6/1977 | Edwards . | |
| 4,071,818 | 1/1978 | Krisst | 324/208 |
| 4,158,964 | 6/1979 | McCrea et al. . | |
| 4,305,283 | 12/1981 | Redding | 73/290 V |
| 4,361,835 | 11/1982 | Nagy | 340/624 |
| 4,382,382 | 5/1983 | Wang | 73/304 R |
| 4,726,226 | 2/1988 | Tellerman | 73/292 |
| 4,839,590 | 6/1989 | Koski et al. | 324/208 |
| 4,890,491 | 1/1990 | Vetter et al. | 73/290 R |
| 4,924,700 | 5/1990 | Habart | 73/290 V |
| 4,970,464 | 11/1990 | Williams | 324/207.13 |
| 5,017,867 | 5/1991 | Dumais et al. | 324/207.13 |
| 5,050,430 | 9/1991 | Begin et al. | 73/292 |
| 5,050,433 | 9/1991 | Lumetta | 73/313 |
| 5,076,100 | 12/1991 | Hunter et al. | 73/290 V |
| 5,189,911 | 3/1993 | Ray et al. | 73/292 |
| 5,253,521 | 10/1993 | Abramovich et al. | 73/306 |

*Primary Examiner*—William A. Cuchlinski, Jr.
*Assistant Examiner*—Willie Morris Worth
*Attorney, Agent, or Firm*—Young & Basile

[57] ABSTRACT

A magnetostrictive liquid level probe in a double-walled liquid container develops liquid level data and external sensors in the space between the walls respond to the presence of liquid leaked into the space from inside or outside the container. Other sensors external of the liquid level probe may sense other conditions. The probe electronics determines binary states of the external sensors and digitally encodes the states for inclusion in data transmission of the liquid level information to a remote controller via a two-wire transmission line. One embodiment develops pulses spaced as a digital function of the sensor states and includes liquid level data between the pulses for transmission. The pulse space is measured at the remote controller and decoded to determine the external sensor states, while the liquid level data is analyzed to determine the contents of the container.

11 Claims, 3 Drawing Sheets

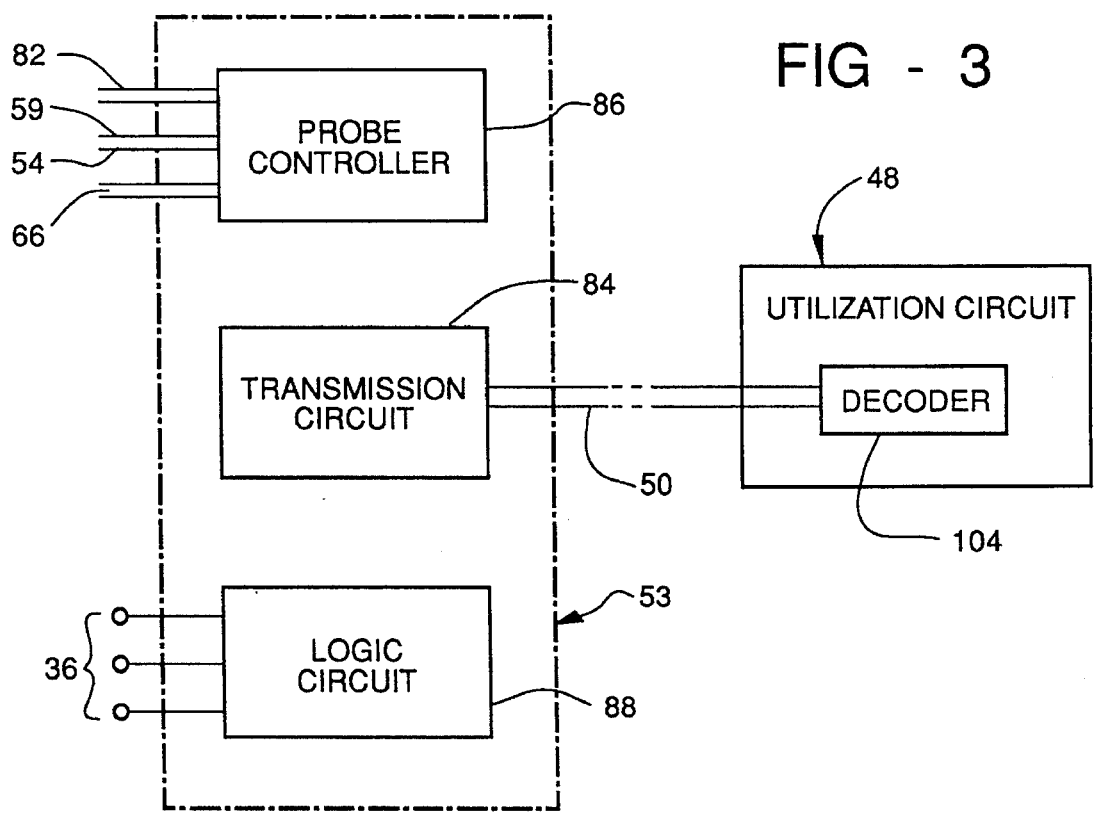
FIG - 3
FIG - 5
| 90 | 92 | 94 | T |
|---|---|---|---|
| 0 | 0 | 0 | 8 |
| 1 | 0 | 0 | 8.5 |
| 0 | 1 | 0 | 9 |
| 1 | 1 | 0 | 9.5 |
| 0 | 0 | 1 | 10 |
| 1 | 0 | 1 | 10.5 |
| 0 | 1 | 1 | 11 |
| 1 | 1 | 1 | 11.5 |
FIG - 7
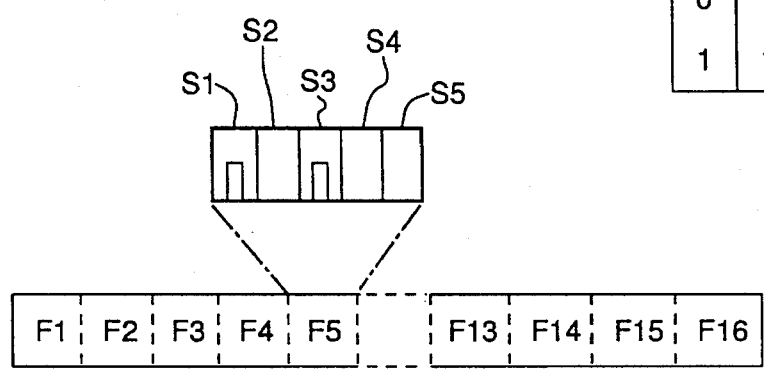

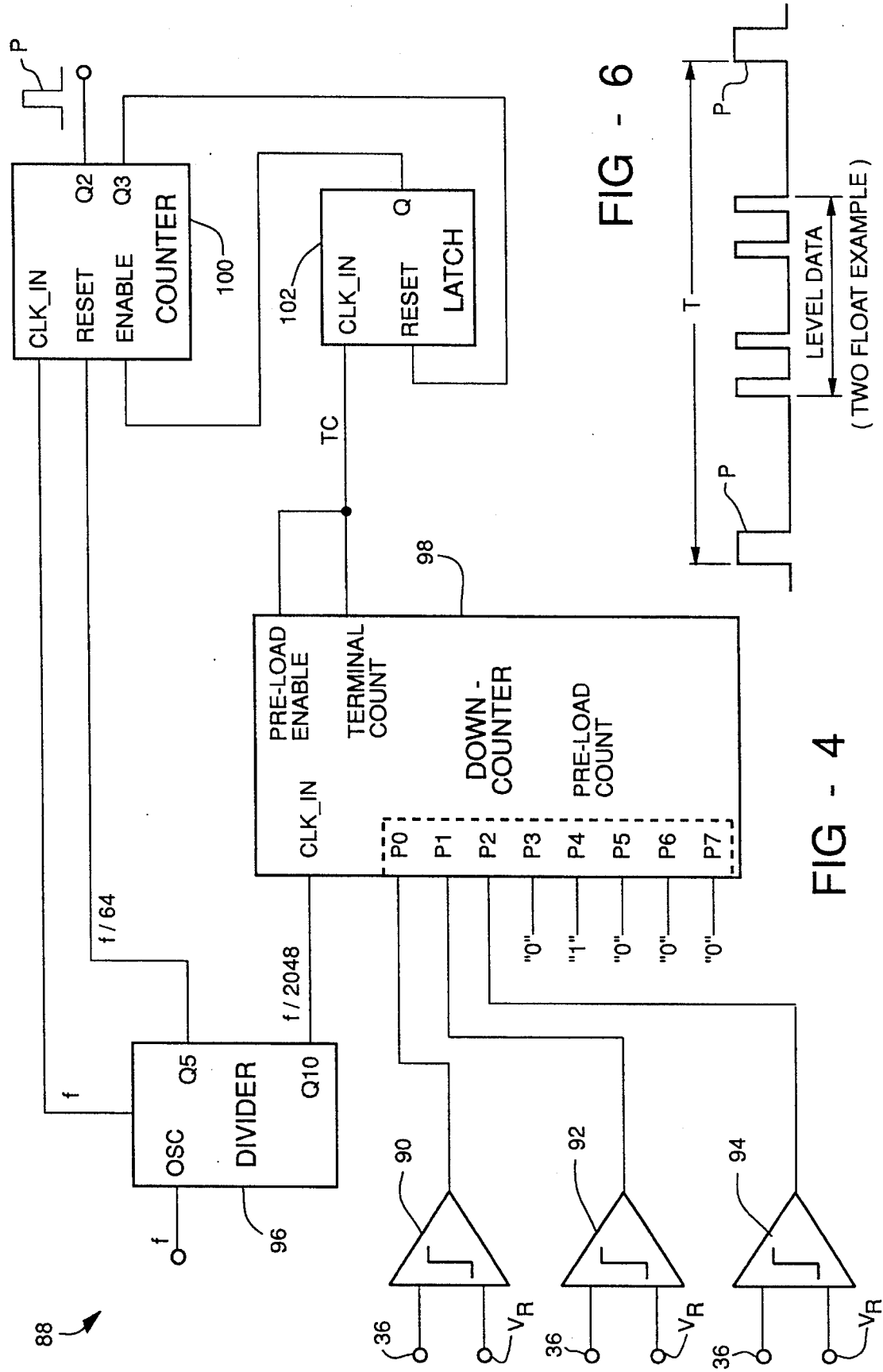

INTEGRATED LIQUID LEVEL AND AUXILIARY SENSOR SYSTEM AND METHOD

FIELD OF THE INVENTION

This invention relates to data transmission of data from condition sensors and a magnetostrictive position transducer and more particularly to combined data transmission from a liquid level transducer and condition sensors either internal or external of the liquid container. Background of the Invention The usefullness of the phenomenon of magnetostriction in linear distance or position measuring devices is recognized by the prior art; for example, see Redding, U.S. Pat. No. 4,305,283; McCrea et al, U.S. Pat. No. 4,158,964; Krisst, U.S. Pat. No. 4,071,818; Edwards, U.S. Pat. No. 4,028,619; and Tellerman, U.S. Pat. No. 3,898,555. A magnet near or around the magnetostrictive wire marks the location to be measured. Such devices can operate with either mechanical or electrical excitation. When an acoustical/mechanical signal propagating along the wire reaches the area of influence of the magnet an electrical strain is generated. Conversely, when an electrical signal propagating along the wire reaches the area of influence of the magnet an acoustical/mechanical strain is generated. Such linear position detectors are utilized as liquid level detectors. The position of the magnet, and hence the liquid level, is determined as a function of the time required for an acoustical/mechanical disturbance to propagate from one end of the wire through the area of influence of the magnet in the case of mechanical excitation or from the position of the magnet to a sensing apparatus located at one end of the wire in the case of electrical excitation.

An improvement on such devices is disclosed by Dumais U.S. Pat. No. 5,017,867 which includes a reflective termination at the foot of the magnetostrictive wire and measures the difference of the propagation times of a pulse from the magnet position to the foot of the wire and reflected back to the head of the device and of a pulse traveling directly from the magnet to the head. This technique provides twice as much resolution of each measurement since the reflected pulse travels twice as far as the direct pulse for each increment of magnet displacement.

In the field of liquid level detection, it is often useful to simultaneously measure liquid level and measure liquid temperature at one or more locations. Many liquids change volume with temperature. Thus a measurement based upon level alone would not distinguish between cases where the mass of liquid had changed and where the mass of liquid is the same but the volume has changed due to a temperature change. Tellerman, U.S. Pat. No. 4,726,226 has proposed a combined apparatus for simultaneously detecting liquid level using a magnetostrictive position detecting apparatus and detecting temperature at a plurality of positions within the liquid via temperature dependent resistors. Tellerman, U.S. Pat. No. 4,726,226, teaches an encoding technique for transmitting both position and temperature information to a remote site using a single pair transmission line. The resistances of the temperature dependent resistors are measured and these values are used to continuously vary the period of a pulse generator. Position measurements are made at the varying pulse periods of the pulse generator. A composite signal is transmitted on the transmission line in the form of a series of pulses. The time between certain non-consecutive pulses is a measure of the liquid level. The time between groups of pulses corresponds to one of the temperature measurements. The sequence of temperature measurements is known to the apparatus receiving the signal via the transmission line, enabling the pulse period to be translated into temperature.

A similar system was proposed in U.S. Pat. No. 5,050,430 which differs from Tellerman, U.S. Pat. No. 4,726,226 in providing plural liquid level/temperature measurements in sequence. The combined apparatus produces a composite signal for transmission on a two wire transmission line including information regarding the linear displacement measured and the temperature measured by each temperature dependent resistor. The resistance of the temperature dependent resistors is measured in a predetermined sequence employing a sequential switching circuit. The resistance of a first reference resistor having a temperature independent resistance which is less than the lowest expected resistance of the temperature dependent resistors is first measured. Next, the resistance of a second reference resistor having a temperature independent resistance which is greater than the highest expected resistance of the temperature dependent resistors is measured. Then, the resistances of the temperature dependent resistors are measured in a predetermined sequence.

Still another proposal for combining the liquid level and temperature measurements is described in the U.S. Pat. No. 07/966,364, filed Oct. 26, 1992, entitled METHOD OF TRANSMITTING MEASURED TEMPERATURE AND POSITION PARAMETERS FROM A TRANSDUCER, assigned to the assignee of the present invention and incorporated herein by reference. There a magnetostrictive liquid level probe makes a series of level measurements as well as several temperature measurements at various sites in the probe. To efficiently send the data to a remote control station over a two-wire transmission line, a plurality of frames are sequentially transmitted with alternate frames being assigned to level information and the remainder being assigned to temperature information.

All of the above systems utilize the probe to make measurements of liquid level and temperature and report the results to a remote location where the signals can be interpreted and utilized. They recognize the desirability of limiting the communication media to a twowire transmission line. In many cases, however, additional information from the storage tank or the surrounding region needs to be sent to the remote location, and the same concerns for efficiency and economy prevail. For example, in the case of double-walled tanks, sensors can be placed in the space between the walls to detect hydrocarbon or water leakage into the space. As another example, sensors outside each tank may detect whether a pump is operating or a valve is closed. In some cases, it is required, in addition to the liquid level sensor, to detect a liquid over-fill condition by an auxiliary set point detector in the tank. It is desirable to monitor the auxiliary sensors, whether internal or external, without the extra expense of additional transmission lines and safety barriers required for such lines.

SUMMARY OF THE INVENTION

It is therefore an object of the invention to utilize the transmission lines for liquid level detectors for sending additional information on conditions either inside or outside the liquid container. Another object is the combining the information from a probe within a storage tank with information from sensors outside the probe for transmission to a remote location. Another object is digitally encoding auxiliary sensor status at the probe and decoding the status at the remote location.

The invention is carried out by employing sensors of conditions in the vicinity of a storage tank and remote from the probe, for example between the tank walls, wherein the sensor changes state upon the occurrence of a condition (such as the presence of water) or its output changes enough to be detected as an indication of the condition, using the sensor outputs as inputs to a logic circuit in the head of a liquid level probe which digitally encodes the sensor status in a signal and combines the signal with information developed by the probe for transmission to the remote location.

In one embodiment the logic circuit in the probe head has an input for each sensor and determines a time interval which uniquely corresponds to which, if any, of the sensor conditions are present, and the remote station conversely has logic which measures the time interval and determines the sensor conditions from the length of the interval. In effect a time interval is selected in the logic circuit according to a truth table relating each combination of sensor conditions to a time interval, and the same truth table in the remote location is used to decode the conditions from the interval. Pulses separated by the time interval are transmitted by the head, and additional pulses corresponding to liquid level and temperature data are transmitted between the separated pulses.

In another embodiment, a known style of data transmission from the probe head to the remote locations comprises a signal having a plurality of sequential frames, each frame being dedicated to a certain type of data, either liquid level or temperature, as set forth in the above mentioned application Ser. No. 07/966,364. According to the invention, one of the frames is dedicated to external sensor data. That frame is divided into periods, each of which corresponds to one of the sensors in the system. A pulse is inserted into each period according to the condition of the corresponding sensor. For example, if all sensors are "off" or "normal", no pulses are included in the dedicated frame, but for each sensor which is "on" the corresponding period will have a pulse.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a schematic circuit of control module of the probe and the remote controller, according to the invention;

FIG. 4 is a schematic diagram of a logic circuit of FIG. 3;

FIG. 5 is a truth table illustrating the logic of the circuit of FIG. 4;

FIG. 6 is pulse timing diagram illustrating the output signal of the control module of FIG. 3; and FIG. 7 is a timing diagram illustrating the output signal format according to another embodiment of the invention.

DESCRIPTION OF THE INVENTION

Figure 1:
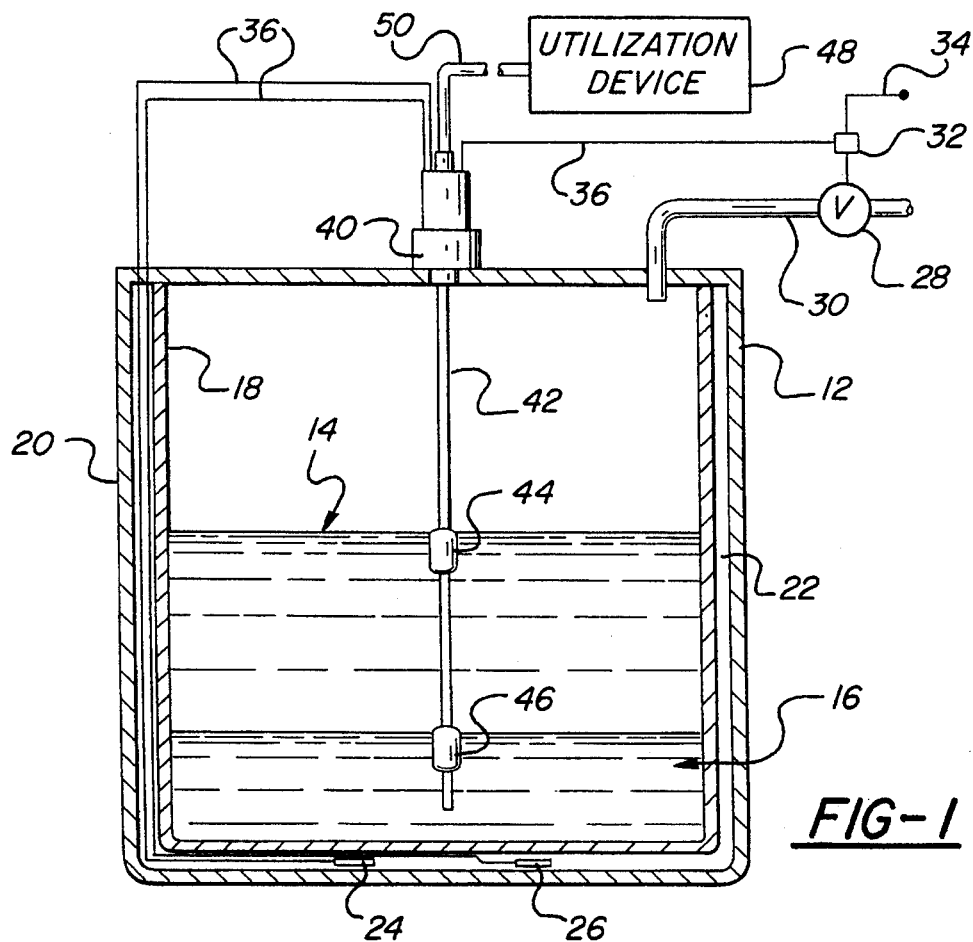
FIG. 1 is an elevational view of a liquid level detection probe and leak detection system for practicing the invention disposed in a tank shown in cross section.

Referring to FIG. 1 there is shown a combined magnetostrictive liquid level detection and plural location temperature detection device or probe 10 disposed in fixed relationship within a tank 12 for liquid 14 such as gasoline, herein called the product, the level of which may vary from empty to a full condition near the top of tank 12. In FIG. 1 tank 12 is about half full. A quantity of water 16 often resides in the bottom of the tank. The tank has an inner wall 18 containing the product and the water and an outer wall 20 separated from the inner wall 18 by an interstitial space 22. A sensor 24 in the space 22 is responsive to hydrocarbons and a sensor 26 in the space 22 is responsive to water, so that either of the sensors 24, 26 responds to leakage. If either water or gasoline leaks from the tank through the inner wall into the space one of the sensors will be activated. If ground water seeps through the outer wall into the space 22, the sensor 26 will be activated. Such sensors may be of a kind which switches states upon sensing the appropriate fluid, or which gradually changes in resistance or other value according to the concentration of the fluid. Some examples of other types of sensors which might be used are vapor phase hydrocarbon sensors or chemical sensors. Aside from monitoring fluids in the interstitial space, other functions in the region of the storage tank such as pump on/off, valve open/closed and setpoint contact closures may be detected. As an example, a solenoid controlled valve 28 in a pipe 30 for feeding the tank is monitored by an on/off current sensor 32 in the solenoid control line 34. The sensors 24, 26, 32 are connected to the head of the probe 10 by lines 36.

The probe 10 comprises a head portion 40 mounted outside the tank 12 and containing certain electronic components hereinafter described and a stainless steel tube 42 which extends vertically through the top of the tank 12 and through the liquid level measurement field which, in this case, is from a point near the bottom of tank 12 to a point close to the top of tank 12. Mounted on tube 42 for sliding displacement therealong is a float 44 which contains circular or bar magnets for purposes hereinafter described and floats on the surface of the liquid 14, and a float 46, containing similar magnets, which floats at the interface of the liquid 14 and the water 16. The signal processing electronic components in head 40 are connected to a remotely located utilization device 48 by means of a two wire transmission line 50. Utilization device 48 is preferably a sophisticated data processing system having inventory control programming, periodic report printouts and so forth capable of connection to a plurality of probes 10 and associated sensors.

Figure 2:
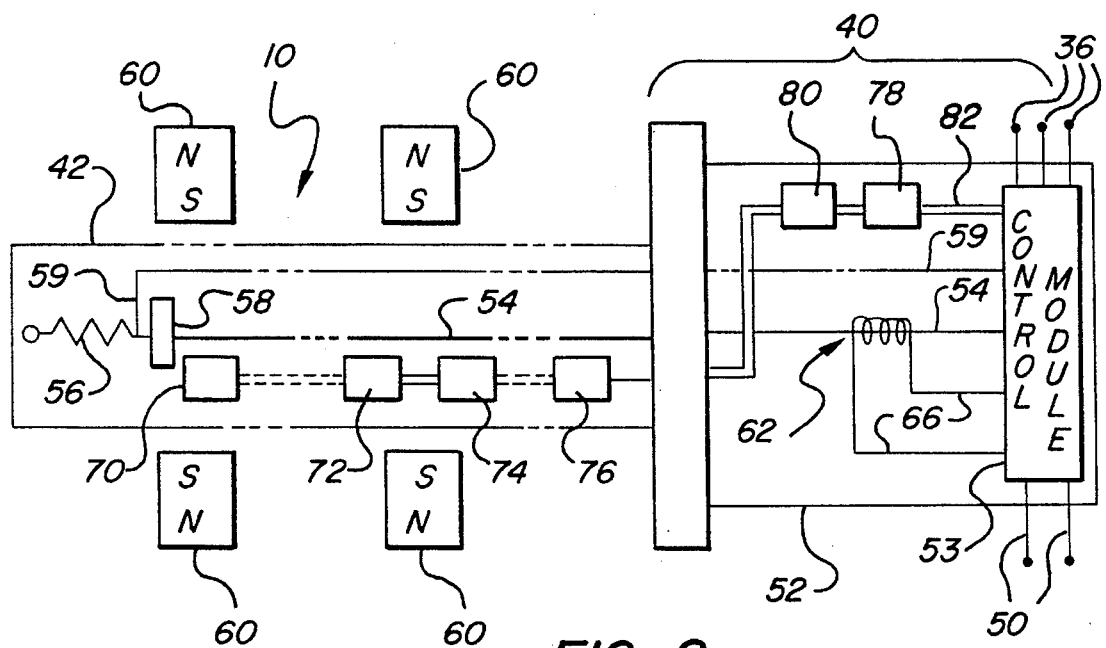
FIG. 2 is a schematic view of the probe of FIG. 1.

FIG. 2 illustrates in schematic form details of the mechanical and electro-mechanical components of device 10. Head 40 includes a base plate 52 connected in a centered position to accommodate a control module 53 and to provide a structure for the mounting of a magnetostrictive wire 54 which is connected to the control module 53. Magnetostrictive wire 54 is preferably formed of nickel/iron alloy; a material known as Nispan C is suitable. Wire 54 runs straight through the center of tube 42 and is secured at the head end by solder to a terminal on an insulative pad (not shown) which is secured to base plate 52. Wire 54 extends through a hollow center of head 40 and, as previously mentioned, through the center of tube 42 along substantially the entire length thereof. At the foot end wire 54 is secured by means of a tension spring 56 to the foot end of tube 42. A reflection collar 58 fastened to the wire near the spring 56 causes a mass discontinuity which serves to reflect torsional strain arriving at the collar back toward the head 40. Wire 54 is held in spaced relationship relative to the interior walls of tube 42 by means of rubber spacers (not shown) which may occur at regular or irregular intervals along the entire length of tube 42. There is essentially no limit on the length of tube 42; i.e., transducers of 40 feet in length are just as feasible as those of only a few feet in length. Spring 56 ensures proper tension in the wire so that it runs straight and parallel through tube 42. The foot end of wire 54 is electrically connected to a fine copper signal return wire 59 which passes in parallel spaced relationship to magnetostrictive wire 54 and through tube 42. The signal return wire 59 and the magnetostrictive wire 54 are electrically connected to the control module 53. For each of the floats 44, 46 a circular magnet 60 having radially arranged north and south poles is slidably disposed around tube 42 so that it may move along the length of tube 42 over the measurement range. A transducer 62 for issuing an electrical pulse when a torsional strain in the wire 54 reaches the head comprises a coil wrapped around the wire near the head end and having leads 66. The magnetostrictive wire 54 has a small amount of residual magnetism as a result of an interrogation pulse applied to the wire and the magnetic flux lines link the windings of the coil. When an acoustical pulse in the wire reaches the head, it alters the magnetic permeability of the wire, thereby changing the magnetic flux field to induce an electrical pulse in the coil and a corresponding signal in its leads 66.

The magnetostrictive linear displacement detector operates as follows. An electrical interrogation pulse is applied by the control module 53 to the series combination of wire 54 and the return wire 58. This pulse has a relatively short duration of a few microseconds. When this pulse reaches the position of a magnet 60 on float 44, a localized torsional strain is imparted to the wire 54 by the interaction of this electrical pulse and the magnetic field of magnet 60. This localized torsional strain propagates along wire 54 toward both the head and the foot ends at a known rate. A typical propagation rate for devices used for liquid level detection is about 9 microseconds per inch. One torsional strain propagates directly toward the head end and another is reflected from the collar 58 and then travels toward the head end. Both strain pulses, in turn, are detected by transducer 62. A similar pair of strain pulses emanating from the location of the second magnet on float 46 is likewise detected. For one pair of pulses, the interval between the pulses is a measure of the water level, and for the other pair of pulses, the corresponding interval is a measure of the product level.

FIG. 2 illustrates temperature dependent resistors 70 to 76 and temperature independent reference resistors 78 and 80, all connected by leads 82 to the control module 53. Temperature dependent resistors 70 to 76 are disposed at spaced intervals along the interior of tube 42 and are exposed to the local temperatures of the liquid within tank 12. Temperature dependent resistors 70 to 76 each have an electrical resistance which is dependent upon temperature in a known manner. Measurement of the resistance of one of temperature dependent resistors 70 to 76, such as by measuring the voltage drop induced by a fixed current, enables determination of the temperature in the vicinity of that resistor. Similar measurements of the reference resistors are also made. The control module is able to access the resistors 70–80 individually and generate a code for the measured resistor value which is sent to the utilization device via the transmission wires 50. The resistor code may, for example, be in the form of spaced pulse pairs where the spacing is indicative of resistance and temperature. The aforesaid application Ser. No. 07/966,364 further details the operation of such a probe.

The control module 53 is shown in FIG. 3 along with the utilization device 48. The control module includes a transmission circuit 84 which is coupled to a probe controller 86 and to a logic circuit 88, and serves as the interface between those circuits 86, 88 and the transmission wires 50. The utilization device 48 supplies power via the wires 50 to the probe head and receives signals generated by the probe controller 86 and the logic circuit 88 in the probe head. The probe controller 86 is connected to the magnetostrictive wire 54, the return wire 59, the transducer leads 66 and the resistor leads 82 for controlling the probe operation and receiving the probe-generated signals. The controller 86 further encodes the signals, if necessary, into a form suitable for transmission. The transmission circuit 84 combines the data codes from the controller 86 with codes from the logic circuit for transmission to the utilization device 48.

FIG. 4 shows the logic circuit 88 which produces a sequence of pulses spaced by an interval which depends on the inputs from the sensors 24, 26 and 32. To establish binary states for the sensors, comparators 90, 92 and 94 have inputs connected to a line 36 from sensors 24, 26, and 32, respectively, and compares those inputs to a reference voltage $V_R$ impressed on the other input of each comparator. If a sensor is off (low voltage) or on (high voltage) the corresponding comparator produces a logic zero or one signal, respectively, the reference voltage $V_R$ being selected at a level between the low and high sensor voltages. Where a sensor has a continuously variable output voltage, the reference $V_R$ is selected to represent a trip level which determines whether the comparator output is logic zero or one. A different value of $V_R$ is selected for each comparator if necessary to determine the appropriate logic level.

A divider 96 driven by a 4 MHz oscillator produces outputs at the oscillator frequency f, at a frequency of f/64, and a frequency of f/2048 which is 0.5 ms. A presettable down counter 98, clocked by a 0.5 ms signal, has binary preload count input pins p0 through p7 allowing a count to be preset which determines the number of countdown pulses required to issue a terminal count TC at the counter output. In this example pin p4 is permanently set to a level of 1 so that a minimum interval between terminal counts is 16 clock pulses or 8 ms. The outputs of the comparators 90–94 are connected to pins p0–p2, respectively, so that the states or conditions of the respective sensors determine the preload count and thus the terminal count interval T according to the truth table of FIG. 5. Thus every combination of logic levels of the comparators 90–94 is represented by a discrete interval T.

The remainder of the logic circuit 88 is dedicated to producing a sequence of logic circuit output pulses, herein called cycle start pulses P, having the desired interval. A 4-bit counter 100 is clocked by the frequency f and has a reset connected to the f/64 signal so that the counter is reset at the f/64 rate. An enable input effects an output at f/4 which is the cycle start pulse P or the output signal of the logic circuit. A latch 102 has a clock input connected to the terminal count of the presettable down counter 98 and has its output connected to the enable input of the counter 100. A reset pin of the latch is coupled to the f/8 output of the counter 100. Thus the terminal count TC sets the latch which enables the counter 100 to initiate the cycle start pulse P at f/4, and when another output occurs at f/8 the latch is reset to remove the enabling signal from the 4-bit counter 100 to turn off the start cycle pulse P. Thus the latch and the 4-bit counter control the width of the start cycle pulse P and the down counter 98 controls the period T of the start cycle pulses.

The transmission circuit 84 transmits the cycle start pulses P and thereby produces a series of output cycles, each cycle beginning at a cycle start pulse and thus having a duration T set by the down counter 98. Data or signals from the probe controller 86 are inserted between the cycle start pulses P so that the liquid level and temperature information is carried in the series of cycles. For example, as shown in FIG. 6, a cycle interval T is determined by two cycle start pulses P, and level data in the form of two pairs of pulses (one pair for each float magnet 60) is incorporated in the cycle interval. Subsequent cycles may contain other pulse pairs related to the resistor or temperature values. In practice it is desirable to use each cycle start pulse P to trigger the probe controller 86 to make the liquid level or resistor measurement by the probe. Both the cycle start pulse P and the resulting probe signal are impressed on the transmission line as soon as they are developed. By setting the minimum interval T at 8 ms, sufficient time is allowed for the development and transmission of a probe measurement in each interval.

In the utilization circuit 48, a decoder 104, incorporating the truth table of FIG. 5, measures the cycle interval T and determines the sensor condition from the table. Thus if the period T is 10.5 ms, it is known that the comparators 90 and 94 have high output and the sensors 24 and 32 are on. The level information is determined from the spacing between the level pulses and the temperature information is determined in accordance with the code scheme chosen for temperature data.

The logic circuit 88 is but one scheme for implementing the invention. There are other ways to digitally encode the condition of the external sensors 24, 26, 32 and transmit the code along with liquid level data on the transmission line 50. One such approach is revealed by the diagram of FIG. 7, wherein the transmission to the utilization circuit is divided into a sequence of frames F1–F16, each frame being dedicated to a particular type of information, e.g., liquid level, value of each resistor, and sensor condition. Here, frame F5 is reserved for sensor condition information and is divided into, say, 5 periods S1–S5, one period for each of five sensors. If sensors no. 1 and no. 3 are on, then pulses are inserted into periods S1 and S3 as shown.

It will thus be appreciated that data generated by devices external to the liquid level probe is processed by the probe electronics and digitally combined with probe related data for transmission over a single wire pair to a remote location, thereby saving the expense of separate data processing and transmission facilities for each external sensor.

The embodiments of the invention in which an exclusive property or privilege is claimed are defined as follows:

1. A system for measuring liquid level in a tank and for monitoring auxiliary sensors comprising;
    a magnetostrictive liquid level detector having a probe head mounted on the tank and a probe extending into the tank for measuring liquid level in the tank and developing a level signal;
    a remote controller coupled to the probe head by a transmission line, the transmission line transmitting the level signal to the remote controller;
    auxiliary sensors outside the probe and coupled to the probe head;
    a control circuit in the probe head for digitally encoding the condition of the auxiliary sensors and for incorporating encoded sensor information in the level signal transmission; and
    logic means in the remote controller for decoding the sensor information.

2. The invention as defined in claim 1 wherein the control circuit encodes the sensor condition by developing pulses which are timed as a function of the condition of the sensors, and transmits the pulses along with the level signal.

3. The invention as defined in claim 1 wherein the control circuit includes means for emitting pulses having a spacing dependent of the condition of the sensors, and the pulses are transmitted to the controller, whereby the logic means in the controller determines sensor conditions from the pulse spacing; and
    the probe head including means for transmitting the level signal in the space between the pulses.

4. The invention as defined in claim 1 wherein:
    the control circuit develops binary signals for each of the auxiliary sensors indicative of the condition of each sensor; and
    the control circuit includes a truth table establishing a time period corresponding to the binary signals, and means for developing pulses spaced according to the time period, whereby the pulses comprise the encoded sensor information.

5. The invention as defined in claim 1 wherein the level signal transmission comprises a sequence of frames, at least one of the frames being divided into discrete periods; and
    the control circuit includes means for inserting pulses into at least some of the discrete periods in dependence on the sensor conditions.

6. The invention as defined in claim 1 wherein the level signal transmission comprises a sequence of frames, at least one of the frames being divided into discrete periods corresponding to respective sensors; and
    the control circuit includes means for selectively inserting pulses into the discrete periods in dependence on the corresponding sensor conditions.

7. In a double walled liquid storage tank having an interstitial space between the walls, apparatus for measuring the liquid level in the tank and for monitoring conditions in the interstitial space comprising:
    a magnetostrictive liquid level probe in the tank and having a probe head mounted externally of the tank;
    sensor means in the interstitial space connected to the probe head for producing a sensor means output in response to fluids in the space;
    logic means in the probe head responsive to the sensor means for digitally encoding the sensor means output response; and
    a probe circuit in the probe head electrically coupled to the probe for outputting a liquid level signal; and
    transmission means coupled to the probe circuit and the logic means for transmitting a combined signal output comprising the liquid level signal combined with the encoded sensor means output.

8. The invention as defined in claim 7 wherein the sensor means responds to the presence of water in the interstitial space.

9. The invention as defined in claim 7 wherein the sensor means responds to leakage of stored liquid into the interstitial space.

10. The invention as defined in claim 7 wherein the sensor means in the interstitial space comprises a plurality of sensors responsive to diverse fluids.

11. The invention as defined in claim 7 wherein the sensor means in the interstitial space comprises a plurality of sensors responsive to diverse fluids such that each sensor output is indicative of the presence or absence of a particular fluid;
    the combined signal output by the transmission means comprises a sequence of signal frames wherein at least one frame is reserved for the encoded sensor means output.

* * * * *

UNITED STATES PATENT AND TRADEMARK OFFICE
CERTIFICATE OF CORRECTION

PATENT NO. : 5,535,625
DATED : July 16, 1996
INVENTOR(S) : Jonathan Levy

It is certified that error appears in the above-indentified patent and that said Letters Patent is hereby corrected as shown below:

Column 2, Line 25, after "Pat." insert -- application Serial --

Column 8, Line 41, delete "response".

Signed and Sealed this

Twenty-ninth Day of October 1996

Attest:

BRUCE LEHMAN

*Attesting Officer*  *Commissioner of Patents and Trademarks*